United States Patent
Lin

(10) Patent No.: US 7,480,455 B2
(45) Date of Patent: Jan. 20, 2009

(54) SURVEILLANCE CAMERA ASSEMBLY WITH EXTERNAL ADJUSTING RINGS

(75) Inventor: Julian Lin, Taipei (TW)

(73) Assignee: VTC Electronics Corporation, Taipei (TW)

( * ) Notice: Subject to any disclaimer, the term of this patent is extended or adjusted under 35 U.S.C. 154(b) by 214 days.

(21) Appl. No.: 11/296,531

(22) Filed: Dec. 8, 2005

(65) Prior Publication Data

US 2007/0133975 A1    Jun. 14, 2007

(51) Int. Cl.
*G03B 15/03* (2006.01)
*G03B 17/00* (2006.01)

(52) U.S. Cl. ..................... 396/182; 396/427
(58) Field of Classification Search ............. 396/182, 396/428, 427, 74, 79; 348/E5.026, E5.027, 348/143, 159, 345
See application file for complete search history.

(56) References Cited

U.S. PATENT DOCUMENTS

| | | | |
|---|---|---|---|
| 2003/0093805 A1* | 5/2003 | Gin | 725/105 |
| 2005/0146641 A1* | 7/2005 | Cheng | 348/373 |
| 2006/0256455 A1* | 11/2006 | Nishimoto | 359/830 |

* cited by examiner

*Primary Examiner*—Rodney E Fuller
(74) *Attorney, Agent, or Firm*—Posz Law Group, PLC

(57) ABSTRACT

A surveillance camera assembly with external adjusting ring has a camera and a cover. The camera comprises a lens assembly, two adjusting rings, and a mounting ring. The lens assembly has a lens and two adjusting rod extending out of the lens and being capable of rotating around to adjust the lens. The mounting ring has two annular surfaces formed and extending from opposite ends. The two adjusting rings are rotatably mounted on a respective annular surface and have a clip formed on an inner surface to correspond and receive a free end of the adjusting rod of the lens such that rotation of the external adjusting rings will rotate the adjusting rod of the lens assembly to do adjustment.

4 Claims, 5 Drawing Sheets ically cylindrical and comprises a camera (10) and a cover (20).

SURVEILLANCE CAMERA ASSEMBLY WITH EXTERNAL ADJUSTING RINGS

BACKGROUND OF THE INVENTION

1. Field of the Invention

The present invention in general relates to a surveillance camera assembly, and more particularly to a surveillance camera assembly with external adjusting rings for easy and convenient adjustment of the camera lens.

2. Description of Related Art

Surveillance cameras are widely used to monitor areas for security or safety reasons. With reference to FIG. 6, a conventional surveillance camera assembly includes a camera (30) and a cover (40).

The camera (30) may be circular and has an inner recess, an outer edge and a lens (31). Multiple slots (34) are defined along the outer edge of the camera (30) and the lens (31) and is mounted in the recess.

The lens (31) has an outer surface and two adjusting rods (32)(33) extend from the outer surface of the lens (31), respectively. The two adjusting rods (32)(33) are able to be rotated to adjust the focus and the depth-of-field of the lens (31).

The cover (40) is mounted over the camera (30) to protect the camera (30). The cover (40) may be dome shaped and has a surface, a lower edge, a cutout and multiple tabs (41). The cutout is defined on the surface and exposes the lens (31) of the camera (30). The multiple tabs (41) are formed along the lower edge of the cover (40) and are received in corresponding slots (34) to connect the cover (40) to the camera (30).

When the surveillance camera is in use, the lens (31) of the camera must be adjusted from time to time. However, with the conventional surveillance camera assembly of the prior art, the cover (40) must first be removed to access the adjusting rods (32)(33) to adjust the lens (31). After adjustment, the cover (40) must be replaced on the camera (30). This makes it troublesome and inconvenient to do adjustments to the lens (31). This makes it difficult and inconvenient doing adjustment.

SUMMARY OF THE INVENTION

An objective of the present invention is to provide a surveillance camera assembly with external adjusting rings to make adjustment of the camera lens easier and more convenient. The surveillance camera assembly with external adjusting rings comprises a camera and a cover.

The camera has a lens assembly, a mounting ring, and multiple adjusting rings.

The lens assembly has a lens with a side surface and two adjusting rods extending from the side surface. The mounting ring has two ends. Each end bus an annular surface extending out and has a cutout formed thereon. The adjusting rings are rotatably mounted on a respective annular surface. Each adjusting ring has a clip formed on an inner surface to receive a free end of a respective adjusting rod and is located in the cutout; thereby, rotation angles of the adjusting rings are respectively limited. One end of the mounting ring is mounted over and secured to the lens assembly.

The cover has a rear end mounted to the camera.

Rotating the adjusting rings will simultaneously rotate the adjusting rods of the lens assembly and therefore the lens of the surveillance camera can be adjusted without having to take off the cover, making adjustment easy and convenient.

DETAILED DESCRIPTION OF THE PREFERRED EMBODIMENT

Figure 1:
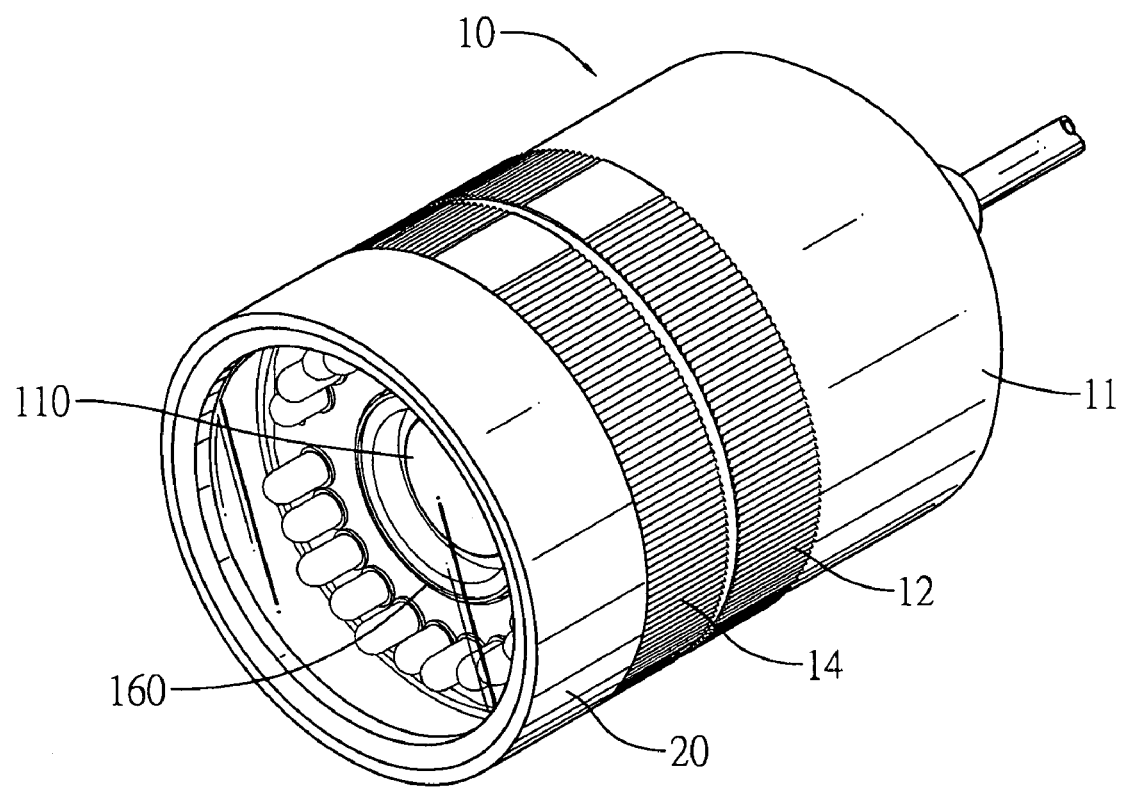
FIG. 1 is a perspective view of a surveillance camera assembly with adjusting rings in accordance with the present invention.
Figure 2:
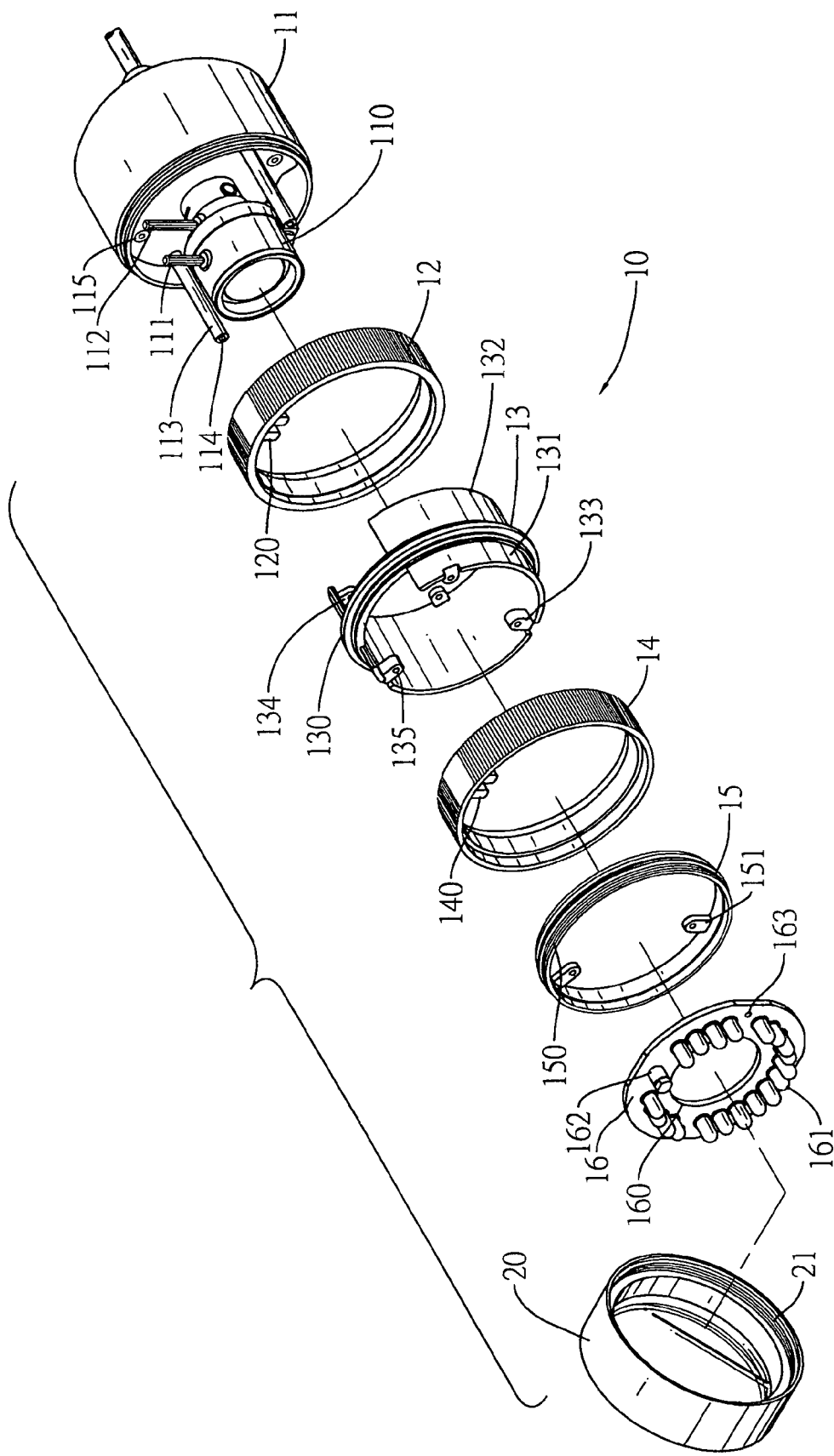
FIG. 2 is an exploded perspective view of the surveillance camera assembly with adjusting rings shown in FIG. 1.
Figure 3:
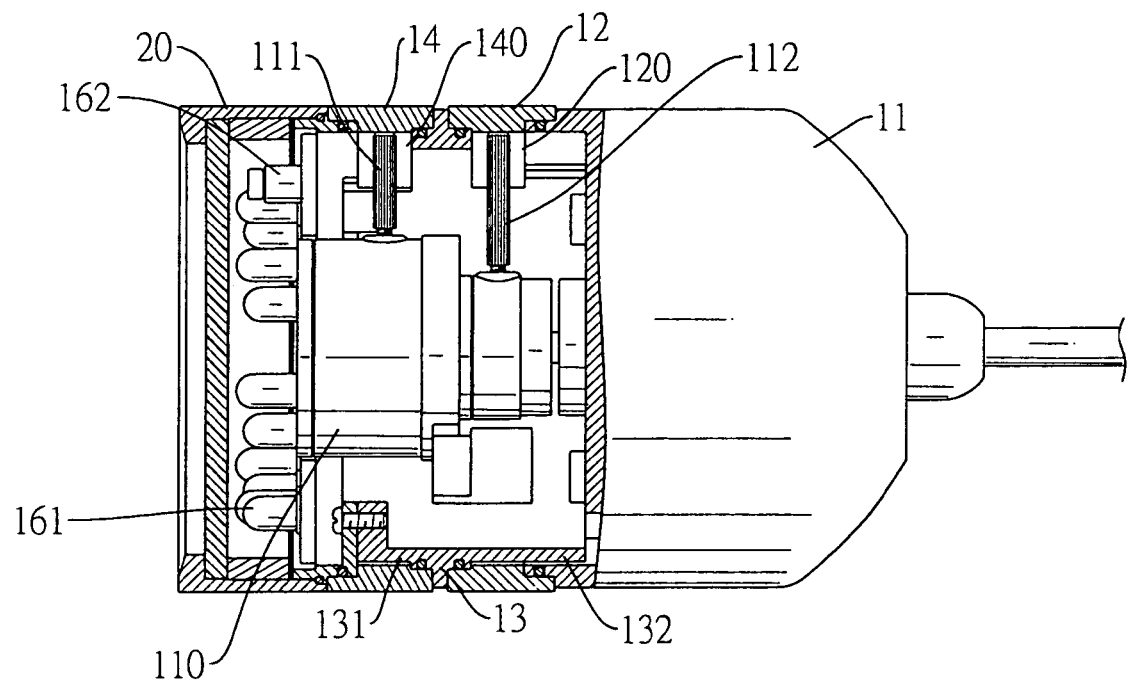
FIG. 3 is a side view in partial section of the surveillance camera assembly with adjusting rings shown in FIG. 1.

With reference to FIGS. 1, 2 and 3, the surveillance camera assembly with external adjusting rings of the present invention is substantially cylindrical and comprises a camera (10) and a cover (20).

The camera (10) has a front end and comprises a lens assembly (11), two adjusting rings (12)(14), a mounting ring (13), a retaining ring (15), an optional illumination panel (16).

The lens assembly (11) has a proximal end and a distal end. A lens (110) is mounted in a surface of the distal end and has two adjusting rods (111)(112) with a free end extending from the lens (110) respectively. Multiple threaded mounting holes (115) are defined in and two connecting rods (113) having a threaded hole (114) defined in a free end extend from the surface of the distal end.

The mounting ring (13) has a front end and a rear end. A front annular surface (131) and a rear annular surface (132) are formed on and extend from the front end and rear end of the mounting ring (13), respectively. Each annular surface (131)(132) has an outer surface, an inner surface, an outer diameter and a cutout. Multiple fastening tabs (133)(134) with threaded mounting holes are formed on the inner surface of each annular surface (131)(l32), respectively.

The two adjusting rings (12)(14) each have an inner surface, an outer surface, and an internal diameter corresponding to the outer diameter of the annular surfaces (131)(132). The adjusting rings (12)(14) are rotatably mounted on a respective annular surface (132)(131) and each has a grip formed on the outer surface to facilitate grabbing, and a clip (120)(140) formed on the inner surface receiving the free ends of the adjusting rods (112)(111) and is respectively located in the cutout of on the annular surface (131)(132). Accordingly, with reference to FIGS. 4 and 5, the clips (120)(140) selectively abut two ends of the corresponding cutout of the annular surface (131)(132), thereby respectively limit rotation angles of the adjusting rings (12)(14) and the adjusting rods (112)(111).

The mounting ring (13) is mounted to the distal end of the lens assembly (11). Multiple screws (not shown) are inserted through the mounting tabs (134) on the rear annular surface (132) and fastened in corresponding mounting holes (115) in the distal end of the lens assembly (11).

The retaining ring (15) has a front end, a rear end and an inner surface. The front end of the retaining ring has a threaded surface (150) and the rear end has multiple mounting tabs (151) with threaded holes formed on the inner surface. The retaining ring (15) is mounted on the front end of the mounting ring (13). Screws are inserted through mounting tabs (151) in the retaining ring (15) to connect to corresponding mounting tabs (133) in the front end of the mounting ring (13).

The illumination panel (16) has a surface, a center, a rim, an aperture (160), two through holes (163), multiple light-emitting elements (161) and a sensor (162). The aperture (160) is defined at a center of the illumination panel (16). The two through holes (163) are defined in the surface and correspond to respective connecting rods (113) in the distal end of the lens assembly (11). The multiple light-emitting elements (161) are mounted on the surface around the aperture (160). The sensor (162) is also mounted on the surface and can activate the multiple light-emitting elements (161) when low-light conditions are detected. Screws (not shown) are inserted through the through holes (163) to securely mount the illumination panel (16) to the connecting rods (113) of the lens assembly (11).

The cover (20) has a rear end with an inner threaded surface (21), which connects to the threaded surface (150) of the retaining ring (15).

Figure 4:
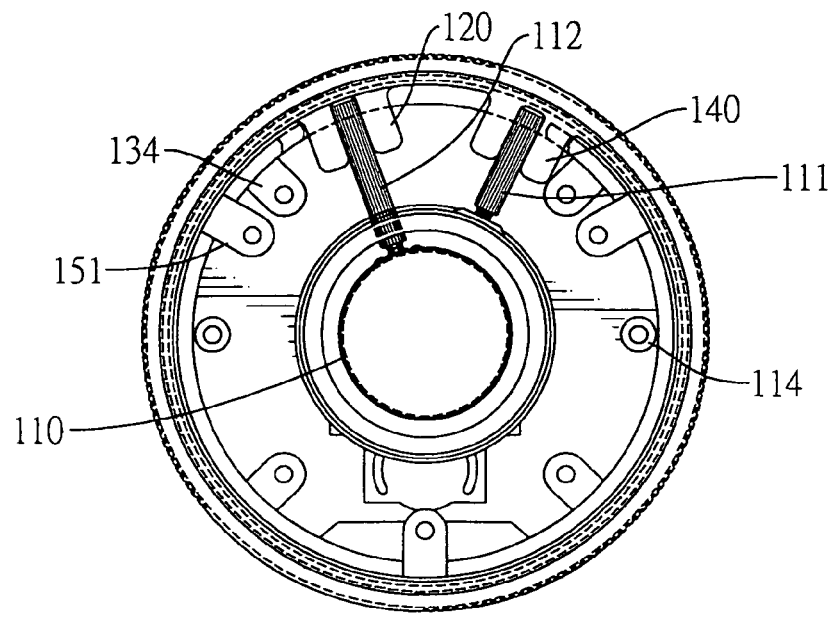
FIG. 4 is an operational end view of the surveillance camera assembly with adjusting rings shown in FIG. 1.
Figure 5:
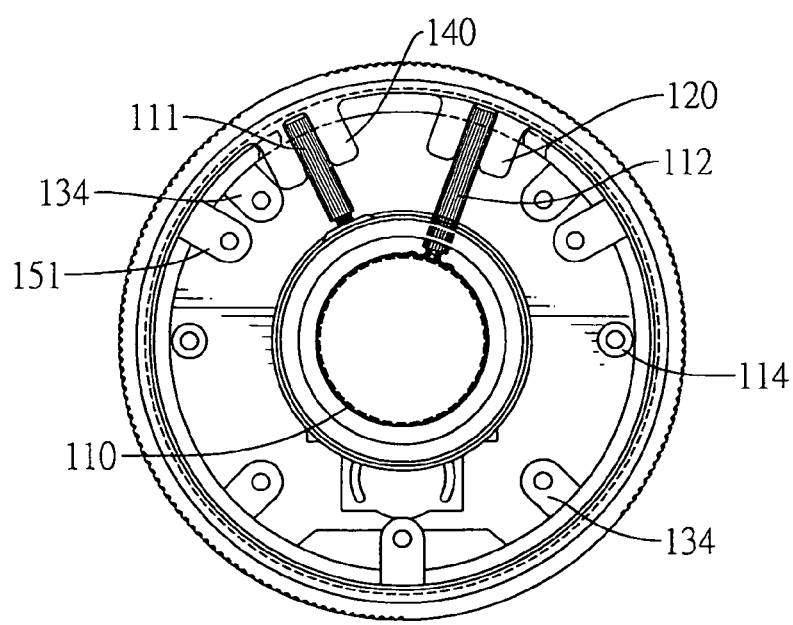
FIG. 5 is an operational end view of the surveillance camera assembly with adjusting rings shown in FIG. 1.
Figure 6:
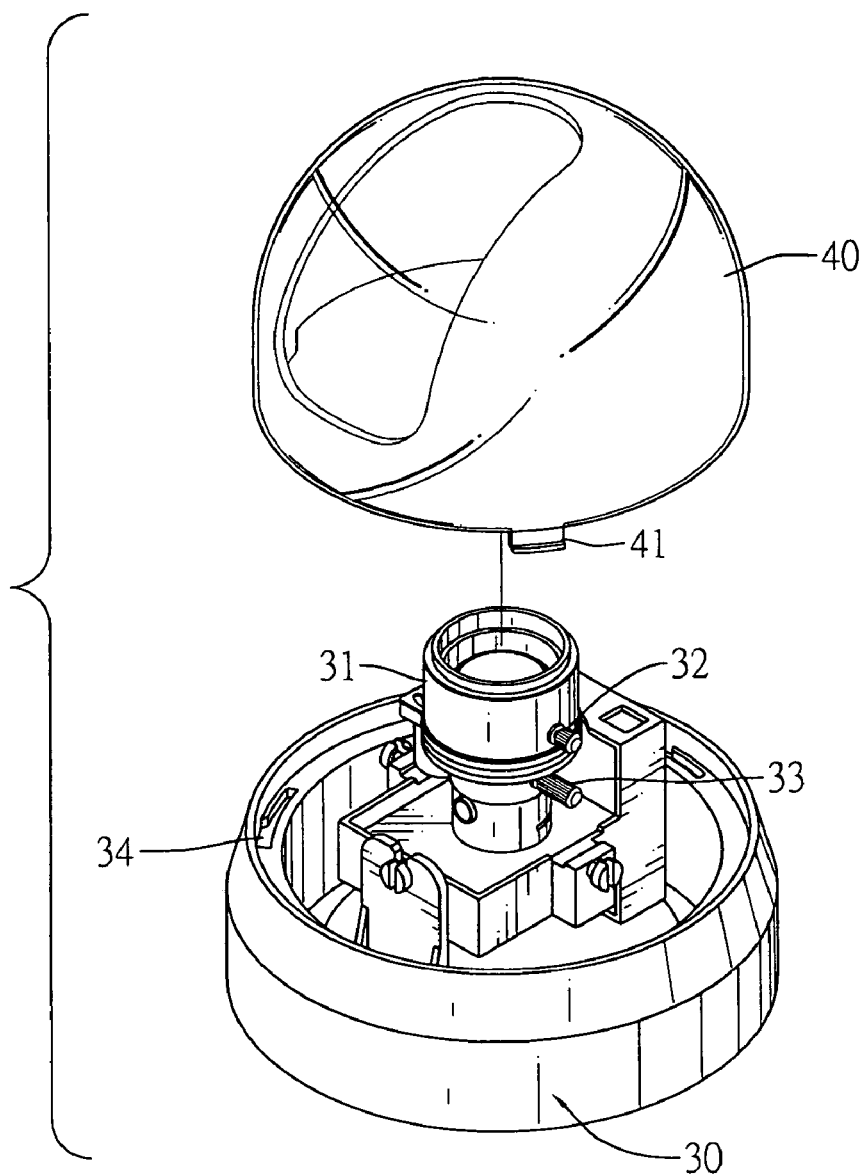
FIG. 6 is a partially exploded perspective view of a conventional surveillance camera in accordance with the prior art.

With reference to FIGS. 4 and 5, the surveillance camera assembly with external adjusting rings of the present invention allows a user to adjust the camera (10) by rotating the two adjusting rings (12)(14) to move the adjusting rod (112)(114) of the lens (110) without having to remove a cover.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A surveillance camera assembly with external adjusting rings comprising:
    a camera including
        a front end;
        a lens assembly having
            a side surface; and
            two adjusting rods mounted to the side surface respectively;
        a mounting ring attached to the lens assembly and having
            a front end;
            a rear end;
            a rear annular surface formed and extending from the rear end and having cutout defined on the rear annular surface; and
            a front annular surface formed and extending from the front end and having a cutout defined on the front annular surface;
        two adjusting rings each rotatably mounted on a respective one of the rear and front annular surfaces of the mounting ring, and each adjusting ring having
            an inner surface; and
            a clip formed on the inner surface and located in a respective one of the cutouts of the annular surface to selectively abut two ends of the corresponding cutout and receiving a free end of one of the adjusting rods of the lens assembly; and
    a cover having a rear end mounting with the front end of the camera.

2. The surveillance camera assembly with external adjusting rings as claimed in claim 1, wherein the surveillance camera assembly further has
    an illumination panel being mounted to the front end of the camera and having
        a surface;
        a center;
        a rim;
        an aperture being defined at a center of the illumination panel;
        multiple light-emitting elements being mounted on the surface around the aperture and
        a sensor being mounted on the surface and able to activate the multiple light-emitting elements when low-light conditions being detected.

3. The surveillance camera assembly with external adjusting rings as claimed in claim 1, wherein each of the adjusting rings further has
    an outer surface; and
    a grip formed on the outer surface.

4. The surveillance camera assembly with external adjusting rings as claimed in claim 1, wherein the clip is rotatable between two ends of the cutout of the annular surface so that a rotation angle of the adjusting ring is regulated by a size of the cutout.

* * * * *